United States Patent
Okabe et al.

(10) Patent No.: US 9,997,776 B2
(45) Date of Patent: Jun. 12, 2018

(54) ALLOY POWDER FOR ELECTRODES, NEGATIVE ELECTRODE FOR NICKEL-METAL HYDRIDE STORAGE BATTERIES INCLUDING THE SAME, AND NICKEL-METAL HYDRIDE STORAGE BATTERY INCLUDING THE SAME

(71) Applicant: PANASONIC INTELLECTUAL PROPERTY MANAGEMENT CO., LTD., Osaka (JP)

(72) Inventors: Akiko Okabe, Osaka (JP); Hideaki Ohyama, Osaka (JP); Shinichi Sumiyama, Osaka (JP); Yasushi Nakamura, Osaka (JP); Kiyoshi Hayashi, Osaka (JP); Hiroki Takeshima, Osaka (JP); Fumio Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 617 days.

(21) Appl. No.: 14/399,145

(22) PCT Filed: Feb. 19, 2014

(86) PCT No.: PCT/JP2014/000861
§ 371 (c)(1),
(2) Date: Nov. 5, 2014

(87) PCT Pub. No.: WO2014/155950
PCT Pub. Date: Oct. 2, 2014

(65) Prior Publication Data
US 2015/0104703 A1    Apr. 16, 2015

(30) Foreign Application Priority Data
Mar. 29, 2013    (JP) .................................. 2013-073850

(51) Int. Cl.
*H01M 4/38* (2006.01)
*C22C 19/03* (2006.01)
(Continued)

(52) U.S. Cl.
CPC ............. *H01M 4/383* (2013.01); *C22C 19/03* (2013.01); *C22C 30/00* (2013.01); *C22C 1/0433* (2013.01);
(Continued)

(58) Field of Classification Search
CPC ...... H01M 4/383; H01M 10/30; H01M 10/26; H01M 2004/027; H01M 2220/20;
(Continued)

(56) References Cited

U.S. PATENT DOCUMENTS 6,733,724 B1    5/2004    Maeda et al.
2003/0054247 A1*    3/2003    Ogasawara ............. H01M 4/32
                                                              429/223

(Continued)

FOREIGN PATENT DOCUMENTS

EP    1075032 A1    2/2001
EP    1465270 A2    10/2004
(Continued)

OTHER PUBLICATIONS

International Search Report issued in International Application No. PCT/JP2014/000861 dated Apr. 1, 2014, with English translation.

*Primary Examiner* — Magali P Slawski
*Assistant Examiner* — Kourtney R S Carlson
(74) *Attorney, Agent, or Firm* — McDermott Will & Emery LLP

(57) ABSTRACT

Disclosed is an alloy powder for electrodes for nickel-metal hydride storage batteries having a high battery capacity and being excellent in life characteristics and high-temperature storage characteristics. The alloy powder includes a hydro-
(Continued)

gen storage alloy containing elements L, M, Ni, Co, and E. L includes La as an essential component. L includes no Nd, or when including Nd, the percentage of Nd in L is less than 5 mass %. The percentage of La in the hydrogen storage alloy is 23 mass % or less. M is Mg, Ca, Sr and/or Ba. A molar ratio $\alpha$ to a total of L and M is $0.045 \leq \alpha \leq 0.133$. A molar ratio x of Ni to the total of L and M is $3.5 \leq x \leq 4.32$, and a molar ratio y of Co is $0.13 \leq y \leq 0.5$. The molar ratios x and y, and a molar ratio z of E to the total of L and M satisfy $4.78 \leq x+y+z < 5.03$.

15 Claims, 1 Drawing Sheet

(51) Int. Cl.
  *C22C 30/00* (2006.01)
  *H01M 10/30* (2006.01)
  *C22C 1/04* (2006.01)
  *H01M 10/26* (2006.01)
  *H01M 4/02* (2006.01)
  *H01M 2/16* (2006.01)

(52) U.S. Cl.
  CPC .......... *H01M 2/1653* (2013.01); *H01M 4/385* (2013.01); *H01M 10/26* (2013.01); *H01M 10/30* (2013.01); *H01M 2004/027* (2013.01); *H01M 2220/20* (2013.01); *H01M 2300/0014* (2013.01); *Y02E 60/124* (2013.01)

(58) Field of Classification Search
  CPC ....... H01M 2300/0014; H01M 2/1653; H01M 4/365; C22C 19/03; C22C 30/00; C22C 1/0433
  USPC .............. 429/206, 218.2; 420/580, 441–460
  See application file for complete search history.

(56) References Cited

U.S. PATENT DOCUMENTS

| | | | |
|---|---|---|---|
| 2003/0091903 A1* | 5/2003 | Sato | H01M 2/1653 429/249 |
| 2004/0170520 A1 | 9/2004 | Maeda et al. | |
| 2006/0194105 A1* | 8/2006 | Kihara | C01B 3/0057 429/218.2 |
| 2010/0009259 A1 | 1/2010 | Ohyama et al. | |
| 2010/0028774 A1 | 2/2010 | Ohyama et al. | |
| 2011/0274972 A1* | 11/2011 | Kanemoto | C22C 19/00 429/219 |
| 2013/0202964 A1 | 8/2013 | Otsuki et al. | |

FOREIGN PATENT DOCUMENTS

| | | |
|---|---|---|
| EP | 2128914 A1 | 12/2009 |
| EP | 2607509 A1 | 6/2013 |
| JP | 06-306515 A | 11/1994 |
| JP | 09-306486 | 11/1997 |
| JP | 2001-040442 A | 2/2001 |
| JP | 2001-181763 A | 7/2001 |
| JP | 2001-291510 A | 10/2001 |
| JP | 2002-080925 A | 3/2002 |
| JP | 2004-285406 A | 10/2004 |
| JP | 2006-037122 A | 2/2006 |
| JP | 2006-114259 A | 4/2006 |
| JP | 2008-053223 A | 3/2008 |
| JP | 2010-182684 A | 8/2010 |
| JP | 2012-099250 A | 5/2012 |
| JP | 2012-102343 A | 5/2012 |
| WO | 2009/013848 A1 | 1/2009 |
| WO | 2009/037806 A1 | 3/2009 |
| WO | 2012/023610 A1 | 2/2012 |
| WO | 2012/057351 A1 | 5/2012 |

* cited by examiner

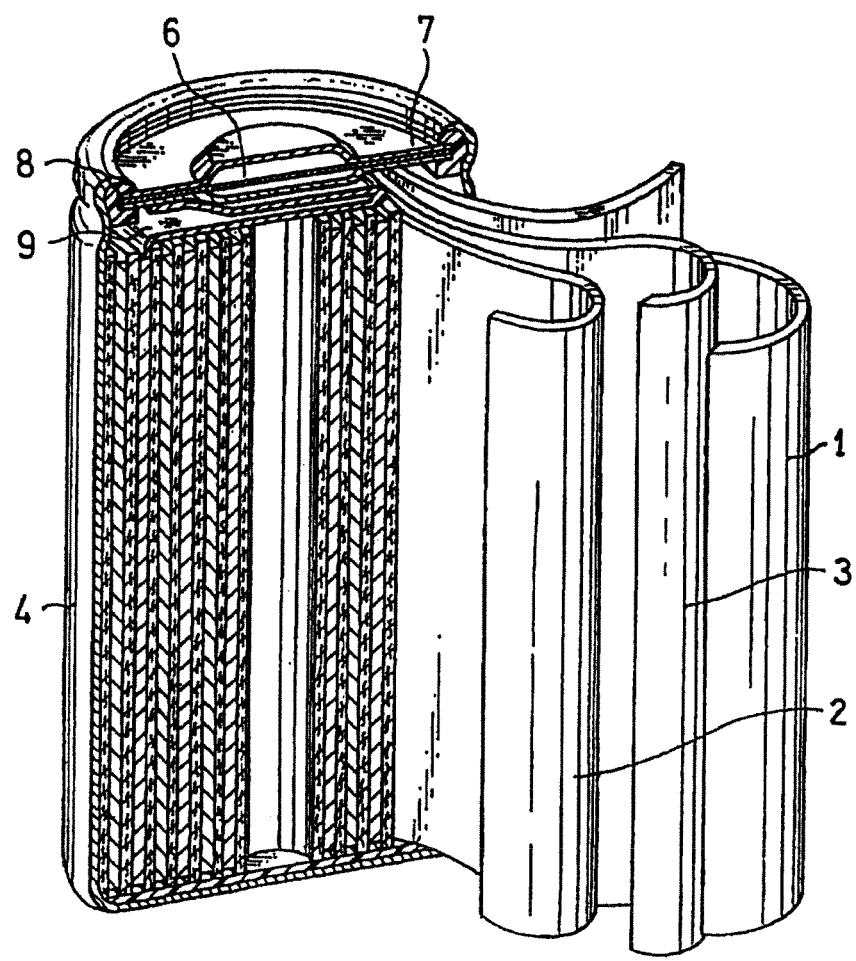

ALLOY POWDER FOR ELECTRODES, NEGATIVE ELECTRODE FOR NICKEL-METAL HYDRIDE STORAGE BATTERIES INCLUDING THE SAME, AND NICKEL-METAL HYDRIDE STORAGE BATTERY INCLUDING THE SAME

RELATED APPLICATIONS

This application is the U.S. National Phase under 35 U.S.C. § 371 of International Application No. PCT/JP2014/000861, filed on Feb. 19, 2014, which in turn claims the benefit of Japanese Application No. 2013-073850, filed on Mar. 29, 2013, the disclosures of which Applications are incorporated by reference herein.

TECHNICAL FIELD

The present invention relates to an alloy powder for electrodes, a negative electrode for nickel-metal hydride storage batteries including the same, and a nickel-metal hydride storage battery including the same, specifically to an improvement of an alloy powder for electrodes including a hydrogen storage alloy.

BACKGROUND ART

Alkaline storage batteries including a negative electrode which includes a hydrogen storage alloy as a negative electrode active material are excellent in output characteristics, and have excellent durability (e.g., life characteristics and/or storage characteristics). Such alkaline storage batteries are attracting attention for use as a replacement for dry batteries, a driving power source for electric vehicles, and other applications. On the other hand, lithium ion secondary batteries are also increasingly used for these applications in recent years. In view of increasing the advantage of alkaline storage batteries, the battery characteristics including output characteristics and durability are expected to be further improved.

The most widely used hydrogen storage alloy is the one having a $CaCu_5$-type crystal structure. To improve the battery characteristics of alkaline storage batteries, various attempts have been made to optimize the performance of the hydrogen storage alloy powder.

For example, Patent Literature 1 proposes that, in view of improving the storage characteristics at high temperatures, a hydrogen storage alloy containing La-mischmetal (La content: 60 to 90 wt %), Ni, Co and Mn, and Mg and being surface-treated with acid or alkali be used as a negative electrode active material for alkaline storage batteries.

Patent Literature 2 proposes that, in view of improving the battery capacity and the high rate discharge characteristics as well as suppressing crumbling into fine powder, a hydrogen storage alloy having a $CaCu_5$-type crystal structure and containing 24 to 33 wt % of La and 0.1 to 1.0 wt % of Mg or Ca be used as a negative electrode active material for nickel-metal hydride storage batteries.

Patent Literature 3 proposes that, in view of improving the cycle characteristics and discharge capacity, a hydrogen storage alloy having a $CaCu_5$-type crystal structure and containing: rare earth element A including Y; Mg and/or Ca; an element such as Co, Mn and Al; and Ni be used as an electrode active material for nickel-metal hydride storage batteries.

CITATION LIST

Patent Literature

[PTL 1] Japanese Laid-Open Patent publication No. 2001-291510
[PTL 2] Japanese Laid-Open Patent publication No. 2002-080925
[PTL 3] Japanese Laid-Open Patent publication No. 2006-37122

SUMMARY OF INVENTION

Technical Problem

The hydrogen storage alloy typically includes an element with high affinity for hydrogen and an element with low affinity for hydrogen. In a hydrogen storage alloy having a $CaCu_5$-type ($AB_5$-type) crystal structure, an element with high affinity for hydrogen tends to be located at the A site, and an element with low affinity for hydrogen tends to be located at the B site. The element with low affinity for hydrogen acts to prevent a formation of noticeable crystal defects due to expansion and contraction of the alloy by absorbing and releasing hydrogen. However, increasing the ratio (B/A ratio) of the element with low affinity for hydrogen to the element with high affinity for hydrogen reduces the hydrogen storage ability, which makes it difficult to increase the discharge capacity.

Patent Literature 1 discloses a hydrogen storage alloy having a comparatively high B/A ratio. When the B/A ratio is high, it is easy to suppress the alloy deterioration associated with expansion and contraction of the alloy during charge and discharge, but difficult to obtain a high capacity. Moreover, the metal elements located at the B site, such as Co, are more likely to leach out into the electrolyte, leading to alloy deterioration, and/or re-deposition of leached metal elements, which may cause deterioration in battery characteristics or an internal short circuit. Such leaching of metal elements tends to be severe particularly at high temperatures, and after storage at high temperatures, the battery capacity may drop considerably. Therefore, it is also important to improve the high-temperature storage characteristics of the battery.

Moreover, Patent Literature 1 uses a mischmetal containing a comparatively large amount of Nd. Since Nd is very expensive among rare earth elements, the use of a hydrogen storage alloy as disclosed by Patent Literature 1 will increase the battery production cost. Furthermore, in an $AB_5$-type alloy, when a large amount of Nd is contained, the hydrogen storage ability tends to reduce.

La has a high affinity for hydrogen and is comparatively inexpensive among rare earth elements, and therefore can be suitably used for a hydrogen storage alloy. In Patent Literature 2, the percentage of La in the alloy is set to 24 wt % or more for achieving a higher capacity. However, the La contained in the hydrogen storage alloy is highly susceptible to oxidation. Accordingly, when the alloy contains a large amount of La, the alloy will deteriorate, and the life characteristics will degrade. Moreover, a high capacity is difficult to obtain in Patent Literature 2, since a hydrogen storage alloy having a comparatively high B/A ratio is used.

Patent Literature 3 sets the B/A ratio to 4.7 or less in order to prevent the reduction in discharge capacity. Decreasing the B/A ratio like this is considered to enhance the hydrogen storage ability. By decreasing the B/A ratio, however, the crystal structure of the hydrogen storage alloy becomes unstable, and the alloy tends to deteriorate during charge and discharge, damaging the life characteristics.

In view of the above, one aspect of the present invention intends to provide an alloy powder for electrodes which is useful for providing a nickel-metal hydride storage battery having a high battery capacity and being excellent in life characteristics and high-temperature storage characteristics.

Solution to Problem

One aspect of the present invention relates to an alloy powder for electrodes including a hydrogen storage alloy. The hydrogen storage alloy contains element L, element M, Ni, Co, and element E. The element L is at least one selected from the group consisting of Group 3 and 4 elements of the periodic table, and includes La as an essential component. The element L either includes no Nd or includes Nd, and a percentage of Nd in the element L when including Nd is less than 5 mass %. A percentage of La in the hydrogen storage alloy is 23 mass % or less. The element M is at least one selected from the group consisting of Mg, Ca, Sr, and Ba. The element E is at least one selected from the group consisting of Group 5 to 11 transition metal elements except Ni and Co, Group 12 elements, and Group 13 to 14 elements of the third to the fifth row of the periodic table. A molar fraction (hereinafter referred to as molar ratio) $\alpha$ of the element M to a total of the element L and the element M is $0.045 \leq \alpha \leq 0.133$, a molar ratio x of Ni to the total of the element L and the element M is $3.5 \leq x \leq 4.32$, and a molar ratio y of Co to the total of the element L and the element M is $0.13 \leq y \leq 0.5$. The molar ratio x, the molar ratio y, and a molar ratio z of the element E to the total of the element L and the element M satisfy $4.78 \leq x+y+z < 5.03$.

Another aspect of the present invention relates to a negative electrode for nickel-metal hydride storage batteries, including a negative electrode active material comprising the aforementioned alloy powder for electrodes.

Yet another aspect of the present invention relates to a nickel-metal hydride storage battery including a positive electrode, the aforementioned negative electrode, a separator interposed between the positive electrode and the negative electrode, and an alkaline electrolyte.

Advantageous Effects of Invention

According to the present invention, by controlling the composition of a hydrogen storage alloy, a high battery capacity can be obtained, and the deterioration of the hydrogen storage alloy during charge and discharge can be suppressed. Therefore, the life characteristic of the nickel-metal hydride storage battery can be improved. In addition, the deterioration of the hydrogen storage alloy during storage at high temperatures can be suppressed, and therefore, the high-temperature storage characteristics of the nickel-metal hydride storage battery can be improved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A longitudinal cross-sectional view schematically illustrating a structure of a nickel-metal hydride storage battery according to one embodiment of the present invention.

DESCRIPTION OF EMBODIMENTS (Alloy Powder for Electrodes)

An alloy powder for electrodes according to one embodiment of the present invention includes a hydrogen storage alloy, and the hydrogen storage alloy contains element L, element M, Ni, Co, and element E. The element L is at least one selected from the group consisting of Group 3 and 4 elements of the periodic table, and includes La as an essential component. The element L either includes no Nd or includes Nd, and the percentage of Nd in the element L when including Nd is less than 5 mass %. The percentage of La in the hydrogen storage alloy is 23 mass % or less. The element M is at least one selected from the group consisting of Mg, Ca, Sr, and Ba. The element E is at least one selected from the group consisting of Group 5 to 11 transition metal elements except Ni and Co, Group 12 elements, and Group 13 to 14 elements of the third to the fifth row of the periodic table. A molar ratio $\alpha$ of the element M to a total of the element L and the element M is $0.045 \leq \alpha \leq 0.133$. A molar ratio x of Ni to the total of the element L and the element M is $3.5 \leq x \leq 4.32$. A molar ratio y of Co to the total of the element L and the element M is $0.13 \leq y \leq 0.5$. The molar ratio x, the molar ratio y, and a molar ratio z of the element E to the total of the element L and the element M satisfy $4.78 \leq x+y+z < 5.03$.

In the alloy powder for electrodes according to one embodiment of the present invention, the hydrogen storage alloy constituting the alloy powder contains the aforementioned elements. The molar ratio x of Ni, the molar ratio y of Co, and the molar ratio z of the element E, to the total of the element L and the element M satisfy $4.78 \leq x+y+z < 5.03$. The hydrogen storage alloy in which x+y+z is within the above range usually has an $AB_5$-type crystal structure. In such a hydrogen storage alloy, an element with high affinity for hydrogen tends to be located at the A site, and an element with low affinity for hydrogen tends to be located at the B site. Therefore, the value of x+y+z corresponds to the ratio between these elements (B/A ratio).

Increasing the B/A ratio can suppress the expansion and contraction of the alloy during charge and discharge, and thus can easily suppress the deterioration of the alloy during charge and discharge. By increasing the B/A ratio, however, the hydrogen storage ability is reduced, which easily leads to a lower capacity. Moreover, by increasing the B/A ratio, the metal elements located at the B site, such as Co, become more likely to leach out into the electrolyte. Such leaching of metal elements causes alloy deterioration. Furthermore, re-deposition of leached metal elements causes reduction in capacity, and/or partial depletion of electrolyte, which leads to battery deterioration and thus to degradation in life characteristics. When re-deposition of leached metal elements occurs, segregation is likely to occur. Segregation can be a cause of degradation in battery characteristics and/or of internal short-circuits. Since the leaching of metal elements tends to be severe particularly at high temperatures, the life characteristics (i.e., high-temperature life characteristics) degrade when the battery is charged and discharged repetitively at high temperatures. When the battery is stored at high temperatures, since the leaching of metal elements is likely to be severe, the battery characteristics after storage at high temperatures (i.e., high-temperature storage characteristics) degrade, damaging the battery capacity.

On the other hand, decreasing the B/A ratio is considered to enhance the hydrogen storage ability, and thus effective in achieving a higher capacity. By decreasing the B/A ratio, however, the crystal structure of the hydrogen storage alloy becomes unstable, and the alloy becomes more likely to deteriorate during charge and discharge, and as a result, the life characteristics degrade. Moreover, La is a highly corrosive element. When the percentage of La is relatively high due to decreased B/A ratio, the alloy becomes susceptible to corrosion, which is detrimental to the capacity and/or the life characteristics. Moreover, the metal elements located at the A site, such as Mg, become more likely to leach out. If such metal elements leach out excessively, the battery characteristics will degrade in association with deterioration of the alloy and/or the re-deposition of metal elements. The leaching of such metal elements is also severe at high temperatures. Therefore, like in the case of Co or the like, the high-temperature life characteristics and the high-temperature storage characteristics tend to degrade.

According to one embodiment of the present invention, as described above, by adjusting the molar ratio x of Ni, the molar ratio y of Co, and the molar ratio z of the element E to satisfy $4.78 \leq x+y+z < 5.03$, the electrode capacity can be increased, and the degradation in life characteristics (particularly high-temperature life characteristics) and the high-temperature storage characteristics can be suppressed. By increasing the electrode capacity, the design battery capacity can be increased, as a result.

Since La has a high affinity for hydrogen, increasing the La percentage in the alloy is considered to improve the hydrogen storage ability, and thus effective in achieving a higher capacity. La, however, is highly corrosive as mentioned above. If the La percentage in the alloy is set excessively high, the alloy will deteriorate as described above, reducing the capacity, and degrading the life characteristics. For this reason, in the above embodiment, the percentage of La in the alloy is set to 23 mass % or less. By controlling the La percentage in the alloy and the B/A ratio in a balanced manner, the life characteristics can be effectively improved, without sacrificing the capacity.

Mischmetal, which has been conventionally used in a hydrogen storage alloy, is a mixture of rare earth elements, and contains Nd in a comparatively large amount. Nd, however, is very expensive among rare earth elements. Inclusion of Nd in a hydrogen storage alloy increases the battery cost. Moreover, increasing the Nd content tends to lower the affinity for hydrogen of the alloy, and is disadvantageous in achieving a higher capacity in an $AB_5$-type hydrogen storage alloy. For the foregoing reason, in the above embodiment, Nd is not included in the element L, or when included, the percentage of Nd in the element L is set to less than 5 mass %. Since the percentage of Nd in the element L is low, the hydrogen storage ability of the alloy is unlikely to be lowered, and the capacity can be easily increased.

In that way, in one embodiment of the present invention, by controlling the composition a hydrogen storage alloy to be used, an electrode with higher capacity can be obtained, and thus a battery with higher capacity can be obtained. Moreover, by improving the leaching resistance and the corrosion resistance of the constituent elements of the hydrogen storage alloy, the deterioration of the alloy can be suppressed. Therefore, the life characteristics can be improved even when the battery is charged and discharged at high temperatures, and a high capacity retention rate can be obtained even after storage at high temperatures. In other words, an alloy powder for electrodes can be provided which is useful for obtaining such a nickel-metal hydride storage battery that has a high capacity and, despite this, is excellent in life characteristics (particularly, high-temperature life characteristics) and high-temperature storage characteristics, and thus in long-term reliability. Therefore, a high level of discharge characteristics and a high level of long-term reliability can be both achieved. Furthermore, since the Nd content is small, the battery production cost can be reduced, while the hydrogen storage ability is kept high.

In the hydrogen storage alloy, Group 3 elements of the periodic table from which element L is selected include Sc, Y, lanthanoids, and actinoids. Lanthanoids include La, Ce, Pr, Nd, Pm, Sm, Eu, Gd, Tb, Dy, Ho, Er, Tm, Yb, and Lu. Actinoids include, for example, Ac, Th, Pa, and Np. Group 4 elements of the periodic table from which element L is selected include Ti, Zr, and Hf. The element L is preferably Sc, Y, a lanthanoid element, Ti and/or Zr, and particularly preferably a lanthanoid element.

The element L includes La as an essential component. The element L can include La and element $L^1$ other than La (specifically, at least one selected from Group 3 elements except La, and Group 4 elements of the periodic table). Group 3 elements except La, and Group 4 elements of the periodic table are those exemplified above. Preferable examples of the element $L^1$ include Sc, Y, lanthanoids except La, Ti, and/or Zr. Particularly preferable examples thereof are lanthanoids except La. Among lanthanoids, at least one selected from the group consisting of Ce, Pr, and Sm is preferred, and Pr and/or Sm is particularly preferred.

The percentage of La in the element L is, for example, 60 mass % or more, preferably 65 mass % or more, and more preferably 68 mass % or more. The percentage of La in the element L is, for example, 90 mass % or less, preferably 85 mass % or less, and more preferably 80 mass % or less, or 75 mass % or less. These lower limits and upper limits can be combined in any combination. The percentage of La in the element L may be, for example, 60 to 90 mass %, or 65 to 80 mass %. When the percentage of La in the element L is within the range as above, the deterioration of the hydrogen storage alloy can be more effectively suppressed, and the capacity can be easily increased.

The percentage of La in the hydrogen storage alloy is, for example, 23 mass % or less, preferably 22.5 mass % or less, and more preferably 22.3 mass % or less. The percentage of La in the hydrogen storage alloy is, for example, 20 mass % or more, and preferably 21 mass % or more, and more preferably 21.5 mass % or more, or 21.8 mass % or more. These upper limits and lower limits can be combined in any combination. The percentage of La in the hydrogen storage alloy may be, for example, 20 to 23 mass %, or 21 to 22.5 mass %. When the percentage of La in the hydrogen storage alloy exceeds 23 mass %, the corrosion resistance of the alloy is reduced, and the life characteristics and the high-temperature storage characteristics are degraded. When the percentage of La in the hydrogen storage alloy is within the range as above, a higher capacity can be easily achieved, and excellent life characteristics and high-temperature storage characteristics can be easily obtained. This can improve the long-term reliability of the battery.

The element L includes no Nd, or even when the element L includes Nd, the percentage of Nd in the element L is less than 5 mass %. The percentage of Nd in the element L is preferably 3.5 mass % or less, and more preferably 2 mass % or less. When the percentage of Nd is 5 mass % or more, the cost increases, whereas the hydrogen storage ability of the alloy is likely to be lowered.

The element M is at least one selected from the group consisting of Mg, Ca, Sr, and Ba. The inclusion of such element M allows formation of an ionically bonded hydride, and improves the hydrogen storage ability. Therefore, a higher capacity can be expected. The element M preferably includes Mg and/or Ca.

In particular, the element M preferably includes Mg. Mg, which readily attracts oxygen molecules and readily migrates onto the surface of the alloy, can form a protective surface film with corrosion resistance including a Mg-containing oxide and/or Mg-containing hydroxide, on the surface or the alloy. The protective surface film thus formed is stable, although Mg in a metal state readily dissolves in alkaline electrolyte. Therefore, the leaching of Co from the alloy can be easily suppressed, whereas excellent discharge characteristics can be easily ensured. Moreover, the high-temperature storage characteristics can be easily improved. When the element M includes Mg, the percentage of Mg in the element M is, for example, 70 mass % or more, preferably 80 mass % or more, and more preferably 90 mass % or more. The percentage of Mg in the element M is 100 mass % or less. It is also preferable that the element M includes Mg only (i.e., the percentage of Mg in the element M is 100 mass %).

The molar ratio α of the element M to a total of the element L and the element M is 0.045 or more, and preferably 0.047 or more, and more preferably 0.05 or more, or 0.06 or more. The molar ratio α is 0.133 or less, preferably 0.132 or less, and more preferably 0.13 or less. These lower limits and upper limits can be combined in any combination. The molar ratio α may be, for example, $0.047 \leq \alpha \leq 0.133$, or $0.05 \leq \alpha \leq 0.13$. When the molar ratio α is less than 0.045, the corrosion resistance in the presence of alkaline electrolyte is likely to be reduced, leading to degradation in high-temperature storage characteristics and high-temperature life characteristics. When the molar ratio α exceeds 0.133, a phase different from $AB_5$ phase is more likely to be formed, and the hydrogen storage ability is reduced, and the alloy becomes susceptible to deterioration. Therefore, the high-temperature life characteristics and/or the high-temperature storage characteristics degrade.

The molar ratio x of Ni to the total of the element L and the element M is 3.5 or more, preferably 3.6 or more, or 3.8 or more. The molar ratio x is 4.32 or less, preferably 4.31 or less, and more preferably 4.3 or less. These lower limits and upper limits can be combined in any combination. The molar ratio x may be, for example, $3.5 \leq x \leq 4.31$, $3.6 \leq x \leq 4.3$, or $3.8 \leq x \leq 4.3$. When the molar ratio x is less than 3.5, the alloy capacity is reduced, and in association therewith, the high-temperature storage characteristics and the high-temperature life characteristics degrade. When the molar ratio x exceeds 4.32, the corrosion resistance in the presence of alkaline electrolyte is likely to be reduced, leading to degradation in high-temperature storage characteristics and high-temperature life characteristics.

The molar ratio y of Co to the total of the element L and the element M is 0.13 or more, preferably 0.15 or more, and more preferably 0.3 or more, or 0.37 or more. The molar ratio y is 0.5 or less, preferably 0.47 or less, and more preferably 0.45 or less. These lower limits and upper limits can be combined in any combination. The molar ratio y may be, for example, $0.15 \leq y \leq 0.47$, $0.15 \leq y \leq 0.45$, or $0.3 \leq y \leq 0.45$.

In the above hydrogen storage alloy containing a specific percentage of Co, Co enters the B site, and the bond with the elements around Co is strengthened. Therefore, formation of crystal defects can be more effectively suppressed when the alloy expands and contracts by absorbing and releasing hydrogen. Therefore, the occurrence of cracks in the alloy can be more effectively suppressed even though charge and discharge are repeated, and thus the life deterioration can be more effectively suppressed.

When the molar ratio y is less than 0.13, the alloy is likely to deteriorate, and consequently, the electrode capacity is reduced. When the molar ratio y exceeds 0.5, a minor short circuit is likely to occur due to Co leached out from the alloy, damaging the electrode capacity. Therefore, in these cases, the high-temperature storage characteristics and the high-temperature life characteristics degrade.

The element E is at least one selected from the group consisting of Group 5 to 11 transition metal elements except Ni and Co, Group 12 elements, and Group 13 to 14 elements of the third to the fifth row of the periodic table. Examples of the element E include: transition metal elements, such as V, Nb, Ta, Cr, Mo, W, Mn, Fe, Pd, Cu, and Ag; Group 12 elements, such as Zn; Group 13 elements, such as Al, Ga, and In; and Group 14 elements, such as Si, Ge, and Sn.

The element E is preferably at least one selected from the group consisting of V, Nb, Ta, Cr, Mo, W, Mn, Fe, Cu, Ag, Zn, Al, Ga, In, Si, Ge, and Sn. The element E particularly preferably includes at least one selected from the group consisting of Mn and Al. When the element E includes Mn, the hydrogen equilibrium pressure of the alloy is likely to be low, and the high hydrogen storage ability can be easily achieved. When the element E includes Al, an oxidative protective surface film is likely to be formed, and the corrosion resistance of the alloy can be improved.

When the element E includes Mn and/or Al, the percentage of Mn and Al in the element E is, for example, in terms of the total of Mn and Al, 80 mass % or more, preferably 85 mass % or more, and more preferably 90 mass % or more. The percentage of Mn and Al in the element E is, in terms of the total of Mn and Al, 100 mass % or less. It is also preferable that the element E comprises Mn and/or Al only.

In order to improve the hydrogen storage ability and the corrosion resistance, as well as to more effectively suppress the formation of crystal defects during absorption and release of hydrogen, the element E preferably includes both Mn and Al. In this case, a molar ratio of Mn to Al (=Mn/Al) is, for example, 0.3/0.7 to 0.7/0.3, preferably 0.4/0.6 to 0.67/0.33, and more preferably 0.5/0.5 to 0.63/0.37.

The total: x+y+z of the molar ratio x, the molar ratio y, and a molar ratio z of the element E to the total of the element L and the element M corresponds to the aforementioned B/A ratio. x+y+z is 4.78 or more, preferably 4.79 or more, and more preferably 4.8 or more. x+y+z is less than 5.03, preferably 5.025 or less, and more preferably 5.02 or less. These lower limits and upper limits can be combined in any combination. x+y+z may be, for example, $4.79 \leq x+y+z < 5.03$, $4.8 \leq x+y+z < 5.03$, or $4.8 \leq x+y+z \leq 5.025$.

When x+y+z is less than 4.78, the initial discharge capacity is increased; however, the crystal structure becomes unstable, and the alloy deteriorates significantly during charge and discharge, degrading the life characteristics. Moreover, during storage at high temperatures, due to increased leaching of the element M such as Mg, the alloy deteriorates, and/or the battery reaction is inhibited by re-deposition of the element M, leading to deterioration in capacity. In short, the high-temperature storage characteristics degrade. When x+y+z is 5.03 or more, particularly at high temperatures, leaching of the elements located at the B site, for example, Co and/or the element E, increases, and the alloy deteriorates. In addition, due to the re-deposition of leached elements, the battery reaction is inhibited. Therefore, the high-temperature life characteristics and the high-temperature storage characteristics degrade.

In the hydrogen storage alloy as above, in a powder x-ray diffraction image thereof as measured by 2θ/θ method using CuKα rays, a ratio: P2/P1 is, for example, 0.045 or less, preferably 0.043 or less, and more preferably 0.04 or less, where P1 is a peak intensity at θ=35 to 37°, and P2 is a peak intensity at θ=10 to 13°. P2/P1 is, for example, 0.007 or more, preferably 0.008 or more, and more preferably 0.01 or more (e.g., 0.017 or more). These lower limits and upper limits can be combined in any combination. P2/P1 is, for example, 0.043 or less, and may be 0.007≤P2/P1≤0.043, or 0.008≤P2/P1≤0.04.

In the above powder x-ray diffraction image, the peak at θ=35 to 37° is characteristic of both $AB_5$-type and $AB_3$-type crystal structures; the peak at θ=10 to 13° is characteristic of $AB_3$-type crystal structure. A relatively high P2/P1 ratio means that the proportion of $AB_3$-type crystal structure is relatively increased (the proportion of $AB_5$-type crystal structure is relatively decreased). When the P2/P1 ratio is within the range as above, the reduction in hydrogen storage ability can be more effectively suppressed, and therefore, the high-temperature storage characteristics and the high-temperature life characteristics can be more effectively improved.

The alloy powder for electrodes can be obtained through, for example, (i) step A of forming an alloy from simple substances of constituent elements of a hydrogen storage alloy, (ii) step B of pulverizing the alloy obtained in the step A, and (iii) step C of activating the pulverized substance obtained in the step B.

(i) Step a (Alloying Process)

In the step A, an alloy can be formed from simple substances of constituent elements by, for example, utilizing a known alloying method. Examples of the alloying method include: plasma arc melting, high-frequency melting (die casting), mechanical alloying (mechanic alloying), mechanical milling, and/or rapid solidification (specifically, methods as described in Kinzoku Zairyo Katsuyou Jiten (metal material application manual) (Industrial Research Center of Japan, 1999), such as roll spinning, melt dragging, direct casting and rolling, in-rotating liquid spinning, spray forming, gas atomization, wet atomization, splat cooling, rapid-solidificated-ribbon grinding, gas atomization and splat cooling, melt extraction, and/or rotating electrode processing). These methods may be used singly or in combination of two or more methods.

In the step A, simple substances of constituent elements are mixed, and the resultant mixture is alloyed by, for example, the above method. The mixture may be melted by heating, to form an alloy of the constituent elements. In the latter case, for example, the following methods can be suitably used: plasma arc melting, high-frequency melting (die casting), and/or rapid solidification. For example, rapid solidification and mechanical alloying may be used in combination.

In the step A, in mixing simple substances of constituent elements, the molar ratio and/or the mass ratio among the simple substances, and other factors are adjusted so that the resultant hydrogen storage alloy can have a desired composition.

The alloy in a molten state is solidified before pulverized in the step B. The alloy can be solidified by supplying the molten alloy into a mold, as needed, and cooling it within the mold. In view of obtaining good dispersion of the constituent elements in the alloy, the supplying speed and other conditions may be adjusted as appropriate.

The resultant solidified alloy (ingot) may be heated, if necessary. By heating, the dispersion of the constituent elements in the hydrogen storage alloy can be easily adjusted. Therefore, the leaching and/or segregation of the constituent elements can be more effectively suppressed, and the hydrogen storage alloy can be more easily activated.

Heating can be performed, without limitation, for example, at a temperature of 900 to 1100° C. in an atmosphere of inert gas such as argon.

(ii) Step B (Pulverizing Process)

In the step B, the alloy obtained in the step A (specifically, the ingot) is pulverized. The pulverization of the alloy may be performed by wet or dry crushing or other methods, or a combination of these methods. For example, a ball mill can be used for crushing. In wet crushing, a liquid medium such as water is used to crush the ingot. The obtained particles may be classified as necessary.

The average particle size of the obtained alloy particles is, for example, 5 to 50 μm, and preferably 5 to 30 μm. When the average particle size is within the above range, the surface area of the hydrogen storage alloy can be maintained within an appropriate range, and the reduction in corrosion resistance as well as the diminishing of hydrogen storage reaction can be more effectively suppressed. Note that the "average particle size" as used herein means a volumetric median diameter.

The alloy particles obtained in the step B is sometimes herein referred to as "raw material powder of the alloy powder for electrodes".

(iii) Step C (Activating Process)

In the step C, the activation of the crushed matter (raw material powder) can be performed by bringing the crushed matter into contact with alkaline aqueous solution. The method of bringing the raw material powder into contact with alkaline aqueous solution includes, but not limited to: immersing the raw material powder in alkaline aqueous solution; adding the raw material powder into alkaline aqueous solution, followed by stirring; and spraying alkaline aqueous solution onto the raw material powder. The activation may be performed under heating, if necessary.

The alkaline aqueous solution is, for example, an aqueous solution containing, as alkali, an alkali metal hydroxide, such as potassium hydroxide, sodium hydroxide and/or lithium hydroxide. Preferred among them are sodium hydroxide and/or potassium hydroxide.

In view of efficiency of activation, productivity and/or process reproducibility, the alkali concentration in the alkaline aqueous solution is, for example, 5 to 50 mass %, and preferably 10 to 45 mass %.

The alloy powder obtained after activation treatment with alkaline aqueous solution may be washed with water. In order to prevent impurities from remaining on the surface of the alloy powder, the washing is preferably finished after the pH of the water used for washing dropped to 9 or less.

The alloy powder having been subjected to activation treatment is usually dried.

The alloy powder for electrodes according to one embodiment of the present invention can be obtained through the process as described above. The obtained alloy powder can increase the capacity of the electrode, and thus of the battery, and can ensure the life characteristics such as high-temperature life characteristics, as well as the high-temperature storage characteristics of the battery. Therefore, the alloy powder for electrodes of the above embodiment can be suitably used as a negative electrode active material of nickel-metal hydride storage batteries.

(Nickel-Metal Hydride Storage Battery)

A nickel-metal hydride storage battery includes a positive electrode, a negative electrode, a separator interposed between the positive electrode and the negative electrode, and an alkaline electrolyte.

The negative electrode includes the aforementioned alloy powder for electrodes, as a negative electrode active material.

The configuration of the nickel-metal hydride storage battery will be described below with reference to FIG. 1. FIG. 1 is a longitudinal cross-sectional view schematically illustrating a structure of a nickel-metal hydride storage battery according to one embodiment of the present invention. The nickel-metal hydride storage battery includes a bottom-closed cylindrical battery case 4 serving as a negative terminal, and an electrode group and an alkaline electrolyte (not shown) encased in the battery case 4. The electrode group includes a negative electrode 1, a positive electrode 2, and a separator 3 interposed therebetween, which are spirally wound together. A sealing plate 7 provided with a safety valve 6 is disposed at the opening of the battery case 4, with an electrically insulating gasket 8 therebetween. The opening end of the battery case 4 is crimped inward, and thereby the nickel-metal hydride storage battery is hermetically closed. The sealing plate 7 serves as a positive terminal, and is electrically connected to the positive electrode 2 via a positive electrode lead 9.

The nickel-metal hydride storage battery can be obtained by encasing the electrode group in the battery case 4, injecting an alkaline electrolyte thereinto, disposing the sealing plate 7 at the opening of the battery case 4 with the insulating gasket 8 therebetween, and sealing the opening end of the battery case 4 by crimping. The negative electrode 1 of the electrode group is electrically connected to the battery case 4 via a negative electrode current collector plate disposed between the electrode group and the inner bottom surface of the battery case 4. The positive electrode 2 of the electrode group is electrically connected to the sealing plate 7 via the positive electrode lead 9.

The constituent elements of the nickel-metal hydride storage battery will now be specifically described.

(Negative Electrode)

The negative electrode is not particularly limited as long as it includes the aforementioned alloy powder for electrodes as a negative electrode active material. Other constituent elements may be any one commonly used in nickel-metal hydride storage batteries.

The negative electrode may include a core material and a negative electrode active material adhering onto the core material. Such a negative electrode can be formed by allowing a negative electrode paste containing at least the negative electrode active material to adhere onto a core material.

The negative electrode core material may be any known one, for example, a porous or non-porous substrate made of stainless steel, nickel or an alloy thereof. When the core material is a porous substrate, the active material may be packed in the pores of the core material.

The negative electrode paste usually includes a dispersion medium, and may include other known components used for the negative electrode, for example, a conductive agent, a binder and/or a thickener, if necessary.

The negative electrode can be formed by, for example, applying a negative electrode paste onto a core material, and drying the paste to remove the dispersion medium, followed by compressing (or rolling).

The dispersion medium may be any known medium, such as water, an organic medium, or a mixed medium thereof.

The conductive agent may be any material with electron conductivity. Examples of such material include: graphite, such as natural graphite (e.g., flake graphite), artificial graphite and expandable graphite; carbon black, such as acetylene black and Ketjen black; conductive fibers, such as carbon fibers and metal fibers; metal particles, such as copper powder; and organic conductive materials, such as polyphenylene derivatives. These conductive agents may be used singly or in combination of two or more. Preferred among them are artificial graphite, Ketjen black and/or carbon fibers.

The amount of the conductive agent is, for example, 0.01 to 50 parts by mass, preferably 0.1 to 30 parts by mass, and more preferably 0.1 to 10 parts by mass, relative to 100 parts by mass of the alloy powder for electrodes.

The conductive agent may be added to the negative electrode paste and used as a mixture with other components. Alternatively, the conductive agent may be applied in advance as a coating onto the alloy powder for electrodes. The coating of the conductive agent can be obtained by any known method, for example, by sprinkling the conductive agent onto the alloy powder, attaching a dispersion containing the conductive agent onto the alloy powder and drying, and/or using mechanical application method such as mechanochemical method.

The binder is preferably a resin material. Examples of the binder include: rubbery materials, such as styrene-butadiene copolymer rubber (SBR); polyolefin resins, such as polyethylene and polypropylene; fluorocarbon resins, such as polytetrafluoroethylene, polyvinylidene fluoride, tetrafluoroethylene-hexafluoro propylene copolymer and tetrafluoroethylene-perfluoroalkyl vinyl ether copolymer; and acrylic resins (including $Na^+$ ion cross-linked products thereof), such as ethylene-acrylic acid copolymer, ethylene-methacrylic acid copolymer and ethylene-methyl acrylate copolymer. These binders may be used singly or in combination of two or more.

The amount of the binder is, for example, 0.01 to 10 parts by mass, and preferably 0.05 to 5 parts by mass, relative to 100 parts by mass of the alloy powder for electrodes.

Examples of the thickener include: cellulose derivatives (e.g., cellulose ethers), such as carboxymethyl cellulose (CMC) and modified products thereof (including salts such as Na salts), and methyl cellulose; saponificated products of polymers having vinyl acetate units such as polyvinyl alcohol; and polyalkylene oxides, such as polyethylene oxide. These thickeners may be used singly or in combination of two or more.

The amount of the thickener is, for example, 0.01 to 10 parts by mass, and preferably 0.05 to 5 parts by mass, relative to 100 parts by mass of the alloy powder for electrodes.

(Positive Electrode)

The positive electrode may include a core material and an active material or active material layer adhering onto the core material. The positive electrode may be one obtained by sintering active material powder.

The positive electrode can be formed by, for example, allowing a positive electrode paste containing at least positive electrode active material to adhere onto a core material. More specifically, the positive electrode can be formed by applying a positive electrode paste onto a core material, and drying the paste to remove the dispersion medium, followed by compressing (or rolling).

The positive electrode core material may be any known one, for example, a porous substrate made of nickel or a nickel alloy, such as nickel foam and sintered nickel plate.

The positive electrode active material is, for example, a nickel compound, such as nickel hydroxide and/or nickel oxyhydroxide.

The positive electrode paste usually includes a dispersion medium, and may include other known components used in the positive electrode, for example, a conductive agent, a binder and/or a thickener, if necessary. The dispersion medium, conductive agent, binder and thickener, and the amounts thereof may be similar to those or selected from the ranges similar to those for the negative electrode paste. Alternatively, a conductive cobalt oxide, for example, cobalt hydroxide and/or γ-type cobalt oxyhydroxide, may be used as the conductive agent. The positive electrode paste may further include a metal compound (oxide and/or hydroxide), for example, zinc oxide and/or zinc hydroxide, as an additive.

(Separator)

The separator may be any one commonly used in nickel-metal hydride storage batteries, for example, a microporous film, a non-woven fabric, or a laminate thereof. Examples of the material of microporous film or non-woven fabric include: polyolefin resins, such as polyethylene and/or polypropylene; fluorocarbon resins; and/or polyamide resins. Preferred is a separator made of polyolefin resin, because it is highly resistant to decomposition in the presence of alkaline electrolyte.

When the separator is made of a highly hydrophobic material such as polyolefin resin, a hydrophilic group is preferably introduced into the separator by hydrophilic treatment. Examples of the hydrophilic treatment include corona discharge treatment, plasma treatment, and sulfonation treatment. The separator may be subjected to one of these hydrophilic treatments or two or more treatments in combination. For example, the separator may be subjected to both corona discharge treatment and sulfonation treatment. Preferably, the separator is subjected to at least sulfonation treatment. Since sulfonation treatment introduces a sulfonic acid group into the separator, a separator having been subjected to sulfonation treatment has a sulfonic acid group.

Preferably, at least part of the separator is sulfonated. The degree of sulfonation of the separator (e.g., separator made of resin) is, for example, $1 \times 10^{-3}$ or more, preferably $1.5 \times 10^{-3}$ or more (e.g., $1.8 \times 10^{-3}$ or more), and more preferably $1.9 \times 10^{-3}$ or more, or $2 \times 10^{-3}$ or more. The degree of sulfonation of the separator is, for example, $4.3 \times 10^{-3}$ or less, preferably $4.15 \times 10^{-3}$ or less, and more preferably $4.1 \times 10^{-3}$ or less, or $4 \times 10^{-3}$ or less. These lower limits and upper limits can be combined in any combination. The degree of sulfonation of the separator may be, for example, $1 \times 10^{-3}$ to $4.3 \times 10^{-3}$, $1.5 \times 10^{-3}$ to $4.1 \times 10^{-3}$, or $1.9 \times 10^{-3}$ to $4.1 \times 10^{-3}$. Note that the degree of sulfonation of the separator (e.g., separator made of resin) is represented by a ratio of sulfur atoms to carbon atoms contained in the separator.

By using a separator having been subjected to hydrophilic treatment such as sulfonation treatment, even though the metal components located at the B site, such as Co and/or the element E (e.g., Mn), leach out from the alloy, those metal components can be captured and inactivated by the interaction between the element M (e.g., Mg) leached out from the alloy and the hydrophilic group introduced into the separator. Therefore, minor short circuits caused by deposition of leached metal components are unlikely to occur, and/or the self-discharge characteristics are unlikely to degrade. Thus, the long-term reliability of the battery can be improved, and excellent self-discharge characteristics can be ensured over a long period of time.

The thickness of the separator can be selected as appropriate from the range of, for example, 10 to 300 μm, and may be, for example, 15 to 200 μm. When the separator is a microporous film, the thickness of the separator is, for example, 10 to 100 μm, preferably 10 to 50 μm, and more preferably 15 to 40 μm. When the separator has a non-woven fabric structure, the thickness of the separator is, for example, 50 to 300 μm, preferably 70 to 200 μm, and more preferably 80 to 150 μm.

The separator preferably has a non-woven fabric structure. Examples of the separator having a non-woven fabric structure include a non-woven fabric, and a laminate of non-woven fabric and microporous film. The separator having a non-woven fabric structure has a weight per unit area of, for example, 35 to 70 $g/m^2$, preferably 40 to 65 $g/m^2$, and more preferably 45 to 55 $g/m^2$.

(Alkaline Electrolyte)

The alkaline electrolyte is, for example, an aqueous solution containing alkali (alkaline solute). Examples of the alkali are alkaline metal hydroxides, such as lithium hydroxide, potassium hydroxide and sodium hydroxide. These may be used singly or in combination of two or more.

For suppressing the self-decomposition of the positive electrode active material, thereby to reduce self-discharge, the alkaline electrolyte preferably contains at least sodium hydroxide as alkali. The alkaline electrolyte may contain at least one selected from the group consisting of sodium hydroxide, potassium hydroxide, and lithium hydroxide.

The sodium hydroxide concentration in the alkaline electrolyte, is, for example, 5 mass % or more, preferably more than 9 mass %, and more preferably 9.5 mass % or more, or 9.7 mass % or more. The sodium hydroxide concentration is, for example, 40 mass % or less, preferably less than 40 mass % (e.g., 35 mass % or less), and more preferably 33 mass % or less. These lower limits and upper limits can be combined in any combination. The sodium hydroxide concentration in the alkaline electrolyte may be, for example, 9.5 to 40 mass %, 9.7 to 35 mass %, or 9.8 to 33 mass %. By setting the sodium hydroxide concentration within the range as above, the high-temperature storage characteristics and the high-temperature life characteristics can be further improved.

The inclusion of potassium hydroxide in the alkaline electrolyte can easily increase the ion conductivity of the electrolyte, and thus achieve a higher output. The potassium hydroxide concentration in the alkaline electrolyte is, for example, 45 mass % or less, preferably less than 41 mass % (e.g., 40.4 mass % or less), and more preferably 33 mass % or less, or 23 mass % or less. The potassium hydroxide concentration is, specifically, 0 mass % or more, preferably 0.05 mass % or more, and more preferably 0.1 mass % or more, or 0.4 mass % or more. These upper limits and lower limits can be combined in any combination. The potassium hydroxide concentration in the alkaline electrolyte may be, for example, 0 to 40.4 mass %, or 0.05 to 40.4 mass %.

When the alkaline electrolyte contains potassium hydroxide, the concentration of potassium hydroxide in the alkaline electrolyte may be higher than that of sodium hydroxide, whereas, for more effectively reducing the self-discharge, the concentration of potassium hydroxide may be lower than that of sodium hydroxide.

The inclusion of lithium hydroxide in the alkaline electrolyte can easily increase the oxygen overvoltage. When the alkaline electrolyte contains lithium hydroxide, for ensuring a high ion-conductivity of alkaline electrolyte, the lithium hydroxide concentration in the alkaline electrolyte is 1 mass % or less, preferably 0.6 mass % of less, and more preferably less than 0.6 mass % (particularly, 0.54 mass % or less). The lithium hydroxide concentration in the alkaline electrolyte is, for example, 0.1 mass % or more, preferably 0.13 mass % or more, and more preferably 0.15 mass % or more, or 0.3 mass % or more. These upper limits and lower limits can be combined in any combination. The lithium hydroxide concentration in the alkaline electrolyte may be, for example, 0.1 to 1 mass %, 0.13 to 0.6 mass %, or 0.13 to 0.54 mass %.

By using an alkaline electrolyte in which the sodium hydroxide concentration and the composition and concentrations of other alkalis are adjusted as described above, especially when it is used in combination with a separator having been subjected to hydrophilic treatment such as sulfonation treatment, the hydrophilic group introduced into the separator can readily interact with the element M leached out from the alloy, such as Mg. As a result, the self-discharge can be easily suppressed over a long period of time.

The specific gravity of the alkaline electrolyte is, for example, 1.03 to 1.55, and preferably 1.11 to 1.32.

EXAMPLES

The present invention is more specifically described below by way of Examples and Comparative Examples. It should be noted, however, that the following Examples should not be construed as limiting the scope of the present invention.

Example 1

(1) Preparation of Raw Material Powder

First, La, Ce, Mg, Ni, Co, Mn and Al simple substances were blended in such a ratio that the composition of a resultant hydrogen storage alloy became $La_{0.66}Ce_{0.27}Mg_{0.07}Ni_{4.00}Co_{0.30}Mn_{0.40}Al_{0.30}$, and then melted in a high-frequency melting furnace. The molten metal was poured (supplied) into a mold at a rate of 2 m/min, to form an ingot. The obtained ingot was heated at 1060° C. for 10 hours in an argon atmosphere. The ingot after heating was crushed into coarse particles. The coarse particles were pulverized in the presence of water in a wet ball mill, and then sieved while wet through a mesh with a mesh diameter of 75 μm. A raw material powder including a hydrogen storage alloy and having an average particle size of 20 μm was thus obtained.

(2) Preparation of Alloy Powder for Electrodes

The raw material powder obtained in (1) above and an alkaline aqueous solution having a temperature of 100° C. and containing 40 mass % of sodium hydroxide were mixed and kept stirred for 50 minutes. The obtained powder was collected, washed with hot water, dehydrated, and then dried. The washing was continued until the pH of the hot water used for washing dropped to 9 or less. As a result, an alloy powder for electrodes from which impurities were removed was obtained.

(3) Production of Negative Electrode

To 100 parts by mass of the alloy powder for electrodes obtained in (2) above, 0.15 parts by mass of CMC (degree of etherification: 0.7, and degree of polymerization: 1600), 0.3 parts by mass of acetylene black, and 0.7 parts by mass of SBR were added, and kneaded together with water, to prepare an electrode paste. The obtained electrode paste was applied onto both surfaces of a nickel-plated iron punched metal (thickness: 60 μm, pore size: 1 mm, and porosity: 42%) serving as a core material. The applied film of the paste was dried, and then pressed together with the core material between rolls. In that manner, a negative electrode being 0.4 mm in thickness and 35 mm in width, and having a capacity of 2200 mAh was obtained. At one end of the negative electrode along its longitudinal direction, the core material was exposed as a core material-exposed portion.

(4) Production of Positive Electrode

A sintered-type positive electrode with a capacity of 1500 mAh including a porous sintered substrate serving as a positive electrode core material and nickel hydroxide packed thereinto was prepared. Here, approximately 90 parts by mass of $Ni(OH)_2$ was used as a positive electrode active material, to which approximately 6 parts by mass of $Zn(OH)_2$ serving as an additive and approximately 4 parts by mass of $Co(OH)_2$ serving as a conductive agent were added. At one end of the positive electrode core material along its longitudinal direction, a core material-exposed portion holding no active material was provided.

(5) Production of Nickel-Metal Hydride Storage Battery

The negative and positive electrodes obtained above were used to produce a ⅘ A-size nickel-metal hydride storage battery having a nominal capacity of 1500 mAh as illustrated in FIG. 1. Specifically, a positive electrode 1 and a negative electrode 2 were wound with a separator 3 interposed therebetween, to form a columnar electrode group. In the electrode group, the core material-exposed portions with no material mixture adhering thereto of the positive and negative electrodes were arranged at opposing end surfaces of the electrode group so that the core materials were exposed there. The separator 3 was a polypropylene nonwoven fabric having been subjected to sulfonation treatment (thickness: 100 μm, weight per unit area: 50 g/m², and degree of sulfonation: $1.90 \times 10^{-3}$). A positive electrode current collector plate was welded to one end surface of the electrode group where the positive electrode core material was exposed. A negative electrode current collector plate was welded to the other end surface of the electrode group where the negative electrode core material was exposed.

The positive electrode current collector plate was electrically connected to a sealing plate 7, via a positive electrode lead 9. Thereafter, with the negative electrode current collector plate facing downward, the electrode group was inserted into a battery case 4 of a cylindrical bottom-closed can. A negative electrode lead connected to the negative electrode current collector plate was welded to the bottom of the battery case 4. After an electrolyte was injected into the battery case 4, the opening of the battery case 4 was sealed with the sealing plate 7 including a gasket 8 at its periphery. A nickel-metal hydride storage battery (battery A) was thus obtained.

The electrolyte used here was an alkaline aqueous solution (specific gravity: 1.23) containing, as alkali, 31 mass % of sodium hydroxide, 1 mass % of potassium hydroxide, and 0.5 mass % of lithium hydroxide.

(6) Evaluation

The electrode alloy powder and the nickel-metal hydride storage battery obtained in the above were evaluated on the following points.

(a) X-Ray Diffraction Spectrum

A powder X-ray diffraction spectrum of the electrode alloy powder was measured by 2θ/θ method using CuKα rays with an X-ray diffractometer (X'PertPRO available from Spectris Co., Ltd.). In the obtained X-ray diffraction spectrum, intensity P1 of the peak at θ=35 to 37° and intensity P2 of the peak at θ=10 to 13° were determined, and ratio: P2/P1 of P2 to P1 was calculated. The measurement conditions of the powder X-ray diffraction spectrum are shown below.

Lamp voltage: 45 kV
Lamp current: 40 mA
Slit: DS=0.5 deg, RS=0.1 mm
Target/Monochromator: Cu/C
Step width: 0.02 deg
Scanning rate: 100 sec/step (b) High-Temperature Storage Characteristics The nickel-metal hydride storage battery was charged at a current value of 0.15 A at 20° C. until the capacity reached 160% of the theoretical capacity, and then discharged at a current value of 0.3 A at 20° C. until the battery voltage dropped to 1.0 V. The capacity at the discharge was measured as an initial discharge capacity.

Subsequently, the nickel-metal hydride storage battery was charged at a current value of 0.15 A at 20° C. until the capacity reached 160% of the theoretical capacity, and stored for two weeks at 45° C. After the storage, the battery was discharged at a current value of 0.3 A at 20° C. until the battery voltage dropped to 1.0 V. The capacity at the discharge was measured as a residual discharge capacity after storage.

The residual discharge capacity after storage was divided by the initial discharge capacity and expressed as a percentage. The value thus obtained was used as an index of high-temperature storage characteristics.

(c) High Temperature Life Characteristics

In a 40° C. environment, the nickel-metal hydride storage battery was charged at a 10-hour rate (150 mA) for 15 hours, and then discharged at a 5-hour rate (300 mA) until the battery voltage dropped to 1.0 V. The charge/discharge cycle was repeated 100 times in total. A ratio of the discharge capacity at the $100^{th}$ cycle to that at the $2^{nd}$ cycle was calculated in percentage as a capacity retention rate. The value thus obtained was used as an index of high-temperature life characteristics.

Example 2 and Comparative Example 1

Raw material powders were prepared in the same manner as in Example 1, except that in the step (1) of Example 1, the blending ratio of simple substances of the elements constituting the hydrogen storage alloy was changed such that the composition of a resultant hydrogen storage alloy became as shown in Table 1. Alloy powders for electrodes and nickel-metal hydride storage batteries (batteries A2 to A11 and batteries B1 to B8) were produced in the same manner as in Example 1, except for using the prepared raw material powders, and evaluated in the same manner as in Example 1.

The evaluation results of Example 2 and Comparative Example 1 are shown in Table 1, together with the composition of the hydrogen storage alloy. Note that batteries A2 to A11 are Example batteries, and batteries B1 to B8 are Comparative Example batteries.

TABLE 1

| | $L_{1-\alpha}M_\alpha Ni_x Co_y E_z$ | | | | | | | | | High-temperature storage characteristics (%) | High-temperature life characteristics (%) |
|---|---|---|---|---|---|---|---|---|---|---|---|
| | L (La/Ce) | La/Alloy (mass %) | M | α | x | y | E (Mn/Al) | x + y + z | P2/P1 | | |
| B1 | 0.69/0.32 | 22.6 | Mg | 0.03 | 4.00 | 0.30 | 0.40/0.30 | 5.00 | 0.005 | 45.0 | 48.0 |
| A2 | 0.68/0.32 | 22.3 | | 0.05 | | | | | 0.010 | 68.3 | 72.6 |
| A1 | 0.66/0.27 | 22.2 | | 0.07 | | | | | 0.020 | 75.2 | 77.0 |
| A3 | 0.62/0.28 | 21.0 | | 0.13 | | | | | 0.040 | 72.4 | 76.3 |
| B2 | 0.61/0.25 | 20.9 | | 0.14 | | | | | 0.050 | 46.0 | 53.4 |
| B3 | 0.66/0.27 | 25.0 | Mg | 0.07 | 3.20 | 0.30 | 0.8/0.7 | 5.00 | 0.020 | 51.3 | 58.3 |
| A4 | | 22.5 | | | 3.60 | | 0.63/0.47 | | | 67.1 | 73.6 |
| A5 | | 22.2 | | | 3.90 | | 0.46/0.34 | | | 72.8 | 75.7 |
| A1 | | 22.2 | | | 4.00 | | 0.40/0.30 | | | 75.2 | 77.0 |
| A6 | | 21.9 | | | 4.30 | | 0.23/0.17 | | | 72.0 | 76.7 |
| B4 | | 21.9 | | | 4.35 | | 0.20/0.15 | | | 49.6 | 52.3 |
| B5 | 0.66/0.27 | 22.3 | Mg | 0.07 | 4.00 | 0.10 | 0.51/0.39 | 5.00 | 0.020 | 47.4 | 55.4 |
| A7 | | 22.3 | | | | 0.15 | 0.49/0.36 | | | 68.5 | 72.8 |
| A1 | | 22.2 | | | | 0.30 | 0.40/0.30 | | | 75.2 | 77.0 |
| A8 | | 22.1 | | | | 0.40 | 0.34/0.26 | | | 74.2 | 71.0 |
| A9 | | 22.0 | | | | 0.45 | 0.31/0.24 | | | 74.4 | 77.1 |
| B6 | | 21.9 | | | | 0.60 | 0.23/0.17 | | | 54.8 | 53.0 |
| B7 | 0.66/0.27 | 22.7 | Mg | 0.07 | 4.00 | 0.30 | 0.26/0.19 | 4.75 | 0.020 | 47.6 | 56.4 |
| A10 | | 22.6 | | | | | 0.29/0.21 | 4.80 | | 76.5 | 78.0 |
| A1 | | 22.2 | | | | | 0.40/0.30 | 5.00 | | 75.2 | 77.0 |
| A11 | | 22.1 | | | | | 0.41/0.31 | 5.02 | | 79.3 | 78.7 |
| B8 | | 21.4 | | | | | 0.60/0.45 | 5.35 | | 49.9 | 53.8 |

Table 1 shows that group A batteries of Examples were excellent in both high-temperature storage characteristics and high-temperature life characteristics.

On the other hand, in Comparative Example batteries B1 and B2 in which the molar ratio α of element M was 0.03 and 0.14, respectively, the high-temperature storage characteristics and the high-temperature life characteristics were both low. This is presumably because in battery B1, an oxide film containing element M was not sufficiently formed on the alloy surface, failing to function as a protective surface film, and therefore, the leaching of constituent elements was not sufficiently suppressed. In battery B2, due to increased formation of crystal phases different from $AB_5$ phase, the alloy capacity was reduced, and the alloy was significantly deteriorated.

Likewise, in Comparative Example batteries B3 and B4 in which the molar ratio x of Ni was 3.20 and 4.35, respectively, the high-temperature storage characteristics and the high-temperature life characteristics were low. This is presumably because in battery B3, due to a low Ni ratio, the alloy capacity was reduced. In battery B4, due to a high Ni ratio, the corrosion resistance in the presence of alkaline electrolyte was reduced, causing the alloy to easily deteriorate in association with its expansion and contraction during charge and discharge.

In Comparative Example batteries B5 and B6, too, in which the molar ratio y of Co was 0.10 and 0.60, respectively, the high-temperature storage characteristics and the high-temperature life characteristics were low. This is presumably because in battery B5, the alloy was significantly deteriorated in association with its expansion and contraction during charge and discharge, and thus the alloy capacity was reduced. In battery B6, an extremely large amount of Co leached into the electrolyte, causing minor short circuits, and as a result, the capacity was reduced.

In Comparative Example batteries B7 and B8, too, in which the B/A ratio (x+y+z) was 4.75 and 5.35, respectively, the high-temperature storage characteristics and the high-temperature life characteristics were low. This is presumably because in battery B7 in which the B/A ratio was 4.75, the crystal structure of the alloy became unstable although it did not go so far as to form a new crystalline phase, and as a result, the alloy capacity was reduced. In battery B8 in which the B/A ratio was 5.35, the proportion of $AB_5$ phase decreased although it did not go so far as to form a new crystalline phase, and as a result, the hydrogen storage capacity was lowered, and the alloy capacity was reduced.

Example 3 and Comparative Example 2

Raw material powders were prepared in the same manner as in Example 1, except that in the step (1) of Example 1, the amounts of La and Ce simple substances used were changed such that the composition of a resultant hydrogen storage alloy became as shown in Table 1. Alloy powders for electrodes and nickel-metal hydride storage batteries (batteries A12 and A13 and battery B9) were produced in the same manner as in Example 1, except for using the prepared raw material powders, and evaluated in the same manner as in Example 1.

Example 4 and Comparative Example 3

Raw material powders were prepared in the same manner as in Example 1, except that in the step (1) of Example 1, Nd simple substance was added, and the amounts of La and Ce simple substances were changed such that the composition of a resultant hydrogen storage alloy became as shown in Table 1. Alloy powders for electrodes and nickel-metal hydride storage batteries (battery A14 and batteries B10 and B11) were produced in the same manner as in Example 1, except for using the prepared raw material powders, and evaluated in the same manner as in Example 1.

The evaluation results of Examples 3 and 4 and Comparative Examples 2 and 3 are shown in Table 2, together with the composition of the hydrogen storage alloy. Note that batteries A12 to A14 are Example batteries, and batteries B9 to B11 are Comparative Example batteries.

TABLE 2

| | | | $L_{1-\alpha}M_\alpha Ni_x Co_y E_z$ | | | | | | | High-temperature storage characteristics (%) | High-temperature life characteristics (%) |
|---|---|---|---|---|---|---|---|---|---|---|---|
| | L (La/Ce/Nd) | La/Alloy (mass %) | M | α | x | y | E (Mn/Al) | x + y + z | P2/P1 | | |
| B9 | 0.7/0.23/0 | 24.0 | Mg | 0.07 | 4.00 | 0.30 | 0.40/0.30 | 5.00 | 0.020 | 43.1 | 50.0 |
| A12 | 0.67/0.26/0 | 22.9 | | | | | | | | 71.2 | 72.5 |
| A1 | 0.66/0.27/0 | 22.2 | | | | | | | | 75.2 | 77.0 |
| A13 | 0.62/0.30/0 | 19.0 | | | | | | | | 63.5 | 69.3 |
| A14 | 0.64/0.26/0.03 | 21.5 | | | | | | | | 71.4 | 74.7 |
| B10 | 0.63/0.25/0.05 | 21.1 | | | | | | | | 55.5 | 55.9 |
| B11 | 0.59/0.24/0.10 | 19.8 | | | | | | | | 49.6 | 52.0 |

Table 2 shows that Example batteries A1, A12 and A13 in which the percentage of La in the hydrogen storage alloy was 23 mass % or less exhibited excellent high-temperature storage characteristics and high-temperature life characteristics. On the other hand, in Comparative Example battery B9 in which the percentage of La in the hydrogen storage alloy was 24.0 mass %, the high-temperature storage characteristics and the high-temperature life characteristics were very low. This is presumably because in Comparative Example battery B9, due to a high percentage of La, the hydrogen storage ability was increased; however, the corrosion resistance of the alloy in the presence of alkaline electrolyte was reduced, and the alloy cracked significantly in association with its expansion and contraction during charge and discharge.

In Comparative Example batteries B10 and B11 using an alloy in which the percentage of Nd in the element L was 5 mass % or more, the high-temperature storage characteristics and the high-temperature life characteristics were much lower than those in Example batteries using an alloy in which the percentage of Nd was less than 5 mass %. This is presumably because in Comparative Example batteries, the percentage of Nd was high, and in turn, the percentage of La was relatively low, resulting in reduced hydrogen storage ability of the alloy.

Example 5

Batteries were produced in the same manner as in Examples, except that in the step (5) of Example 1, polypropylene non-woven fabrics having been subjected to sulfonation treatment and having a degree of sulfonation as shown in Table 3 were used as the separator 3, and the batteries were evaluated on the items of (b) and (c) in the same manner as Example 1. The thickness and the weight per unit area of all the non-woven fabrics were 100 μm and 50 g/m², respectively.

The evaluation results of Example 5 are shown in Table 3, together with the degree of sulfonation of the separator. The results of battery A1 of Example 1 are also shown in Table 3. Note that batteries A15 to A18 are Example batteries.

TABLE 3

|     | Degree of sulfonation | High-temperature storage characteristics (%) | High-temperature life characteristics (%) |
| --- | --- | --- | --- |
| A1  | $1.90 \times 10^{-3}$ | 75.2 | 77.0 |
| A15 | $2.00 \times 10^{-3}$ | 83.2 | 84.0 |
| A16 | $3.10 \times 10^{-3}$ | 83.6 | 85.5 |
| A17 | $4.00 \times 10^{-3}$ | 83.0 | 82.4 |
| A18 | $4.30 \times 10^{-3}$ | 61.1 | 65.2 |

Table 3 shows that in all Examples, the initial capacity was high, and the high-temperature storage characteristics and the high-temperature life characteristics were both excellent. In view of further improving the high-temperature storage characteristics and the high-temperature life characteristics, the degree of sulfonation of the separator is preferably set to less than $4.30 \times 10^{-3}$ (e.g., $4.1 \times 10^{-3}$ or less).

Example 6

Batteries were produced in the same manner as in Example 1, except that in the step (5) of Example 1, a polypropylene non-woven fabric having been subjected to sulfonation treatment (thickness: 100 μm, weight per unit area: 50 g/m², and the degree of sulfonation: $3.10 \times 10^{-3}$) was used as the separator 3, and the alkali concentration in the electrolyte was changed as shown in Table 4, and the batteries were evaluated on the items of (b) and (c) in the same manner as Example 1.

The evaluation results of Example 6 are shown in Table 4, together with the alkali concentration in the electrolyte. The results of battery A16 of Example 5 are also shown in Table 4. Note that batteries A19 to A35 are Example batteries.

TABLE 4

|     | Alkali concentration in electrolyte (mass %) | | | High-temperature storage characteristics (%) | High-temperature life characteristics (%) |
| --- | --- | --- | --- | --- | --- |
|     | NaOH | KOH | LiOH | | |
| A19 | 40 | 1 | 0.5 | 73.2 | 74.5 |
| A16 | 31 | 1 | 0.5 | 83.6 | 85.5 |
| A20 | 28 | 1 | 0.5 | 87.1 | 87.7 |
| A21 | 23 | 1 | 0.5 | 89.2 | 89.6 |
| A22 | 20 | 1 | 0.5 | 88.4 | 89.5 |
| A23 | 17 | 1 | 0.5 | 86.3 | 87.6 |
| A24 | 10 | 1 | 0.5 | 86.6 | 87.4 |
| A25 | 9  | 1 | 0.5 | 77.2 | 78.9 |
| A26 | 23 | 0 | 0.5 | 88.5 | 89.1 |
| A27 | 23 | 0.5 | 0.5 | 88.1 | 87.3 |
| A21 | 23 | 1 | 0.5 | 89.2 | 89.6 |
| A28 | 23 | 10 | 0.5 | 87.1 | 87.6 |
| A29 | 23 | 20 | 0.5 | 86.2 | 86.7 |
| A30 | 23 | 30 | 0.5 | 84.3 | 85.0 |
| A31 | 23 | 40 | 0.5 | 84.1 | 85.1 |
| A32 | 23 | 41 | 0.5 | 76.9 | 78.1 |
| A33 | 23 | 1 | 0   | 88.5 | 88.8 |
| A34 | 23 | 1 | 0.15 | 89.0 | 89.4 |
| A21 | 23 | 1 | 0.5 | 89.2 | 89.6 |
| A35 | 23 | 1 | 0.6 | 77.1 | 80.7 |

Table 4 shows that all Example batteries exhibited excellent high-temperature storage characteristics and high-temperature life characteristics. In view of further improving the high-temperature storage characteristics and the high-temperature life characteristics, the sodium hydroxide concentration in the electrolyte is preferably more than 9 mass % and less than 40 mass %. For the similar reason, the potassium hydroxide concentration in the electrolyte is preferably less than 41 mass %, and the lithium hydroxide concentration is preferably less than 0.6 mass %.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the present invention, it is possible to provide an alloy powder for electrodes capable of improving the capacity, the life characteristics (particularly, high-temperature life characteristics) and the high-temperature storage characteristics of nickel-metal hydride storage batteries. The alloy powder for electrodes can realize excellent battery characteristics even when the batteries are used at high temperatures. Therefore, the batteries are expected to be utilized as a replacement of dry batteries and a power source for various equipment, as well as a promising power source for hybrid vehicles used in severe environment and other applications.

REFERENCE SIGNS LIST

1: Negative electrode, 2: Positive electrode, 3: Separator, 4: Battery case, 6: Safety valve, 7: Sealing plate, 8: Insulating gasket, 9: Positive electrode lead

The invention claimed is:

1. An alloy powder for electrodes, comprising a hydrogen storage alloy, wherein:
   the hydrogen storage alloy consists of element L, element M, Ni, Co, and element E,
   the element L is at least one selected from the group consisting of Group 3 and 4 elements of the periodic table, and includes La as an essential component,
   the element L either includes no Nd or includes Nd, and a percentage of Nd in the element L when including Nd is less than 5 mass %, and a percentage of La in the hydrogen storage alloy is 23 mass % or less,
   the element M is at least one selected from the group consisting of Mg, Ca, Sr, and Ba,
   the element E is at least one selected from the group consisting of Group 5 to 11 transition metal elements except Ni and Co, Group 12 elements, and Group 13 to 14 elements of the third to the fifth row of the periodic table,
   a molar fraction α of the element M to a total of the element L and the element M is $0.045 \leq \alpha \leq 0.133$,
   a molar fraction x of Ni to the total of the element L and the element M is $3.5 \leq x \leq 4.32$,
   a molar fraction y of Co to the total of the element L and the element M is $0.13 \leq y \leq 0.5$, and
   a molar fraction z of the element E to the total of the element L and the element M, the molar fraction x and the molar fraction y satisfy $4.78 \leq x+y+z < 5.03$.

2. The alloy powder for electrodes according to claim 1, wherein the element L is a lanthanoid element.

3. The alloy powder for electrodes according to claim 1, wherein the percentage of La in the hydrogen storage alloy is 22.5 mass % or less.

4. The alloy powder for electrodes according to claim 1, wherein:
the molar fraction α of the element M is $0.05 \le \alpha \le 0.13$,
the molar fraction x is $3.6 \le x \le 4.3$,
the molar fraction y is $0.15 \le y \le 0.45$, and
the molar fraction x, the molar fraction y, and the molar fraction z satisfy $4.8 \le x+y+z<5.03$.

5. The alloy powder for electrodes according to claim 1, wherein the element E is at least one selected from the group consisting of V, Nb, Ta, Cr, Mo, W, Mn, Fe, Cu, Ag, Zn, Al, Ga, In, Si, Ge, and Sn.

6. The alloy powder for electrodes according to claim 1, wherein the element E includes at least one selected from the group consisting of Mn and Al.

7. The alloy powder for electrodes according to claim 1, wherein a ratio: P2/P1 satisfies $P2/P1 \le 0.043$, where P1 is a peak intensity at $\theta=35$ to $37°$ and P2 is a peak intensity at $\theta=10$ to $13°$ in a powder x-ray diffraction image of the hydrogen storage alloy as measured by $2\theta/\theta$ method using CuKα rays.

8. A negative electrode for nickel-metal hydride storage batteries, including a negative electrode active material comprising the alloy powder for electrodes of claim 1.

9. A nickel-metal hydride storage battery comprising a positive electrode, the negative electrode of claim 8, a separator interposed between the positive electrode and the negative electrode, and an alkaline electrolyte.

10. The nickel-metal hydride storage battery according to claim 9, wherein at least part of the separator is sulfonated, and the separator has a degree of sulfonation of $1.5 \times 10^{-3}$ to $4.1 \times 10^{-3}$.

11. The nickel-metal hydride storage battery according to claim 9, wherein the separator has a non-woven fabric structure, the separator has a weight per unit area of 45 to 55 g/m², and the separator has a thickness of 80 to 150 μm.

12. The nickel-metal hydride storage battery according to claim 1, wherein:
the alkaline electrolyte contains sodium hydroxide, and
in the alkaline electrolyte, a sodium hydroxide concentration is 9.7 to 35 mass % with respect to a total mass of the alkaline electrolyte containing sodium hydroxide.

13. The nickel-metal hydride storage battery according to claim 12, wherein:
the alkaline electrolyte further contains potassium hydroxide and lithium hydroxide, and
in the alkaline electrolyte,
a potassium hydroxide concentration is 40.4 mass % or less with respect to a total mass of the alkaline electrolyte containing potassium hydroxide and lithium hydroxide, and
a lithium hydroxide concentration is 0.54 mass % or less with respect to the total mass of the alkaline electrolyte containing potassium hydroxide and lithium hydroxide.

14. The nickel-metal hydride storage battery according to claim 12, wherein:
the alkaline electrolyte further contains potassium hydroxide, and
in the alkaline electrolyte, a potassium hydroxide concentration is 40.4 mass % or less with respect to a total mass of the alkaline electrolyte containing potassium hydroxide.

15. The nickel-metal hydride storage battery according to claim 12, wherein:
the alkaline electrolyte further contains lithium hydroxide, and
in the alkaline electrolyte, a lithium hydroxide concentration is 0.54 mass % or less with respect to the total mass of the alkaline electrolyte containing lithium hydroxide.

* * * * *